United States Patent
Nakata et al.

(10) Patent No.: US 11,231,587 B2
(45) Date of Patent: Jan. 25, 2022

(54) INFORMATION PROCESSING APPARATUS AND IMAGE DISPLAY METHOD

(71) Applicant: SONY INTERACTIVE ENTERTAINMENT INC., Tokyo (JP)

(72) Inventors: Masashi Nakata, Kanagawa (JP); Yasushi Okumura, Tokyo (JP); Yurika Mulase, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/631,568

(22) PCT Filed: Aug. 16, 2018

(86) PCT No.: PCT/JP2018/030421
§ 371 (c)(1),
(2) Date: Jan. 16, 2020

(87) PCT Pub. No.: WO2019/039378
PCT Pub. Date: Feb. 28, 2019

(65) Prior Publication Data
US 2020/0201048 A1    Jun. 25, 2020

(30) Foreign Application Priority Data
Aug. 23, 2017  (JP) .............................. JP2017-160554

(51) Int. Cl.
*G02B 27/01*    (2006.01)
*A63F 13/61*    (2014.01)
(Continued)

(52) U.S. Cl.
CPC .......... *G02B 27/0172* (2013.01); *A63F 13/61* (2014.09); *G06K 9/00671* (2013.01);
(Continued)

(58) Field of Classification Search
CPC .......... G02B 27/0172; G02B 2027/014; G02B 2027/0187; A63F 13/61; A63F 2250/22;
(Continued)

(56) References Cited

U.S. PATENT DOCUMENTS

2007/0296646 A1* 12/2007 Yamamoto ........... G02B 27/017
 345/8
2014/0285404 A1*  9/2014 Takano .............. G02B 27/0172
 345/8

(Continued)

FOREIGN PATENT DOCUMENTS

JP    2008-33891 A    2/2008
JP    2015-222891 A   12/2015
(Continued)

OTHER PUBLICATIONS

Notice of Reasons for Refusal dated Nov. 24, 2020, from Japanese Application No. 2017-160554, 2 sheets.

(Continued)

*Primary Examiner* — Amare Mengistu
*Assistant Examiner* — Gloryvid Figueroa-Gibson
(74) *Attorney, Agent, or Firm* — Katten Muchin Rosenman LLP

(57) ABSTRACT

A line-of-sight direction detection section 32 detects a direction of a line of sight of a user wearing a head-mounted display. A main image generation section 42 generates a first image regarding main content selected by the user as an item
(Continued)

to be displayed on the head-mounted display. A display control section 50 causes the head-mounted display to display a second image regarding content different from the main content for promoting recognition of a given thing or service together with the first image. The display control section 50 controls a manner in which the second image is displayed on the head-mounted display in accordance with the direction of the user's line of sight.

10 Claims, 9 Drawing Sheets

(51) Int. Cl.
*G06T 7/73* (2017.01)
*G06K 9/00* (2006.01)
*G06T 19/00* (2011.01)

(52) U.S. Cl.
CPC .............. *G06T 7/74* (2017.01); *G06T 19/006* (2013.01); *A63F 2250/22* (2013.01); *A63F 2300/8082* (2013.01); *G02B 2027/014* (2013.01); *G02B 2027/0187* (2013.01); *G06T 2207/20104* (2013.01)

(58) Field of Classification Search
CPC . A63F 2300/8082; G06T 7/74; G06T 19/006; G06T 2207/20104; G06K 9/00671
USPC ............................................................ 345/8
See application file for complete search history.

(56) References Cited

U.S. PATENT DOCUMENTS

| 2015/0042953 | A1 | 2/2015 | Teller |
| 2015/0130705 | A1 | 5/2015 | Im |
| 2016/0187976 | A1* | 6/2016 | Levesque ........... G06Q 30/0241 |
| | | | 705/14.4 |
| 2017/0053452 | A1* | 2/2017 | Arai .................... G02B 27/0172 |
| 2018/0003979 | A1 | 1/2018 | Nakashima et al. |

FOREIGN PATENT DOCUMENTS

| JP | 2016-126773 A | 7/2016 |
| JP | 2016-206447 A | 12/2016 |
| JP | 2017-40970 A | 2/2017 |
| JP | 6126271 B1 | 5/2017 |

OTHER PUBLICATIONS

International Search Report and Written Opinion dated Nov. 13, 2018, from International Application No. PCT/JP2018/030421, 9 sheets.

International Preliminary Report on Patentability dated Mar. 5, 2020, from International Application No. PCT/JP2018/030421, 14 sheets.

Decision to Grant dated Jan. 26, 2021, from Japanese Patent Application No. 2017-160554, 3 sheets.

* cited by examiner

F I G. 5
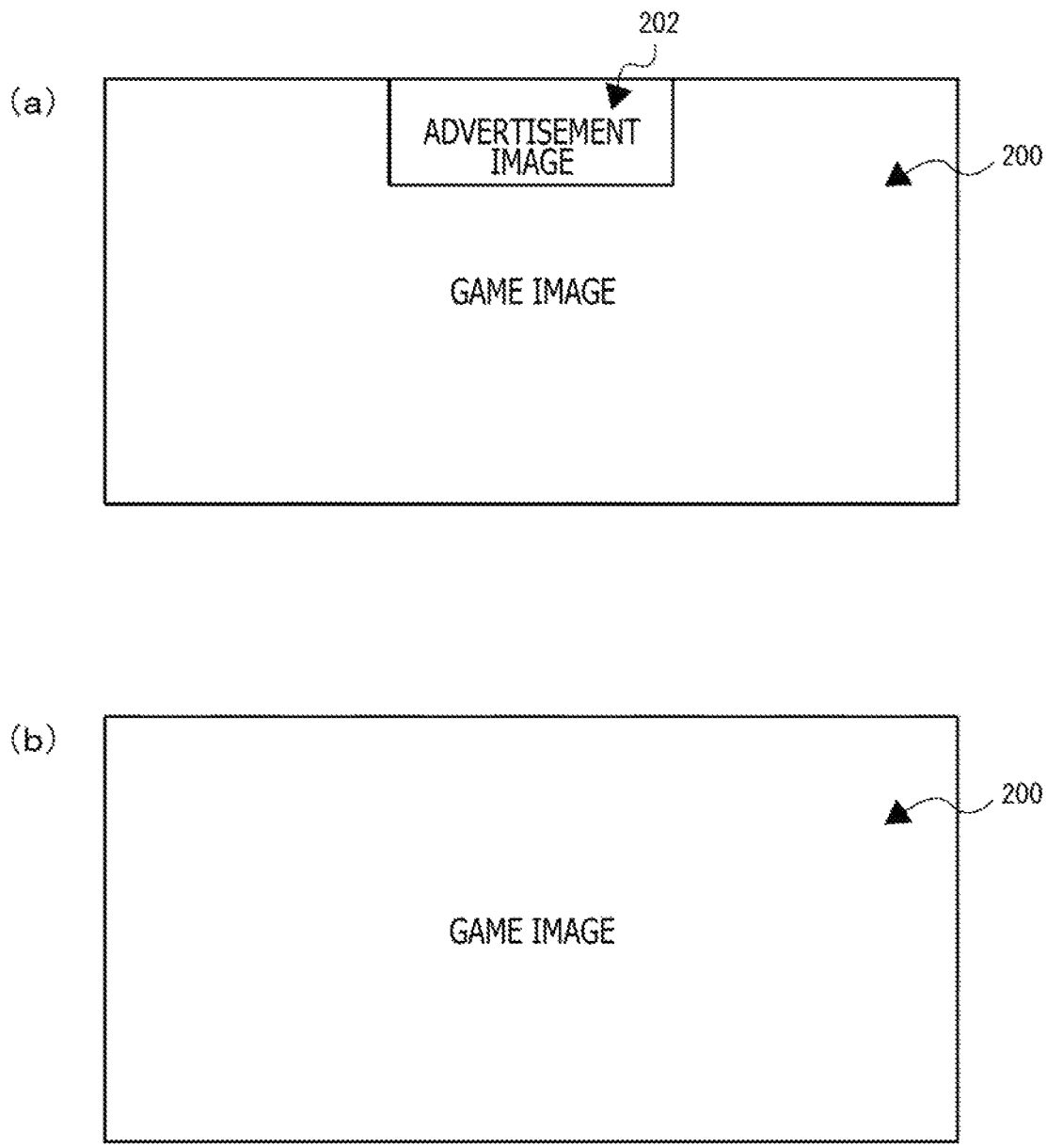

F I G. 6
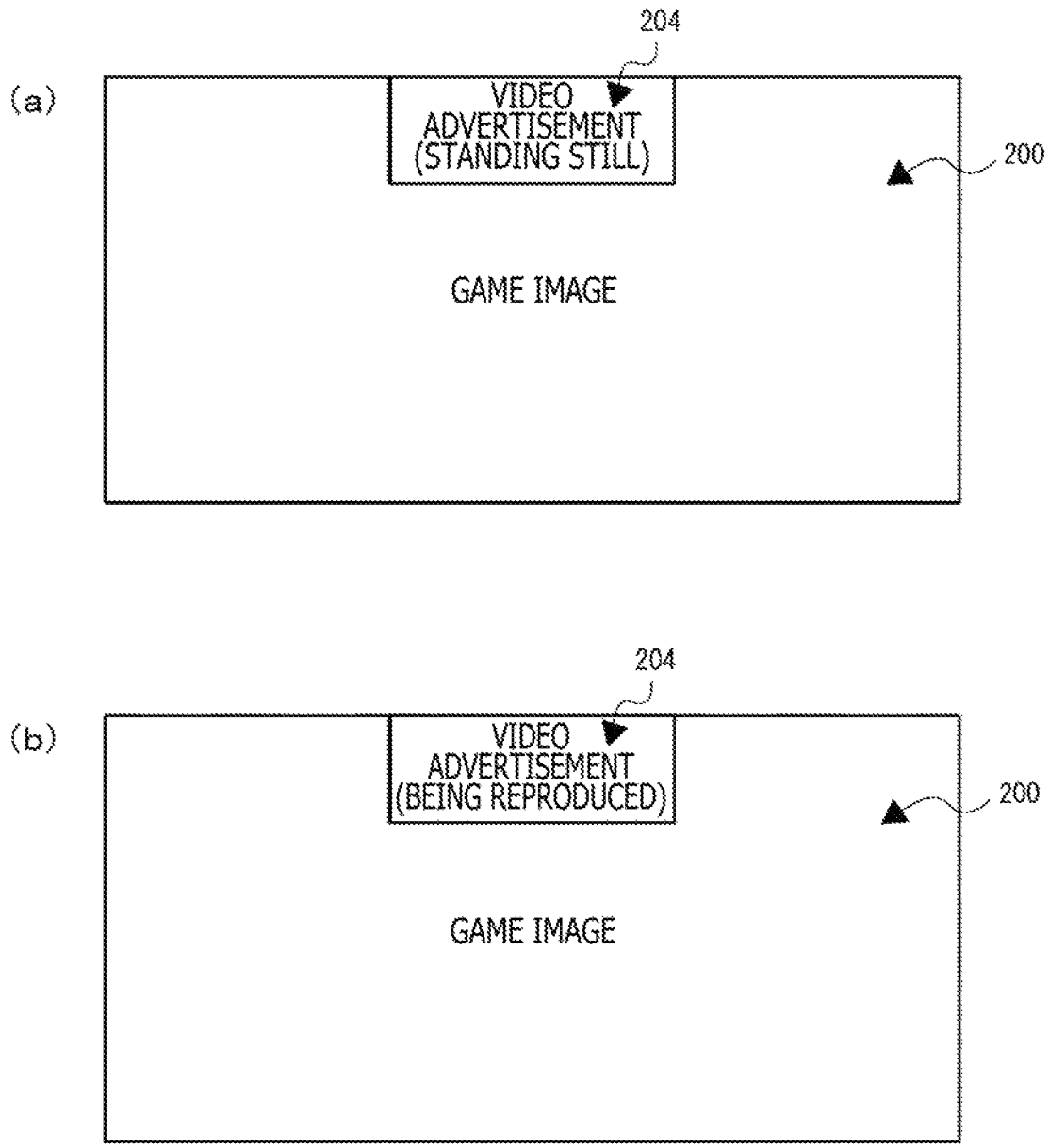

F I G. 8
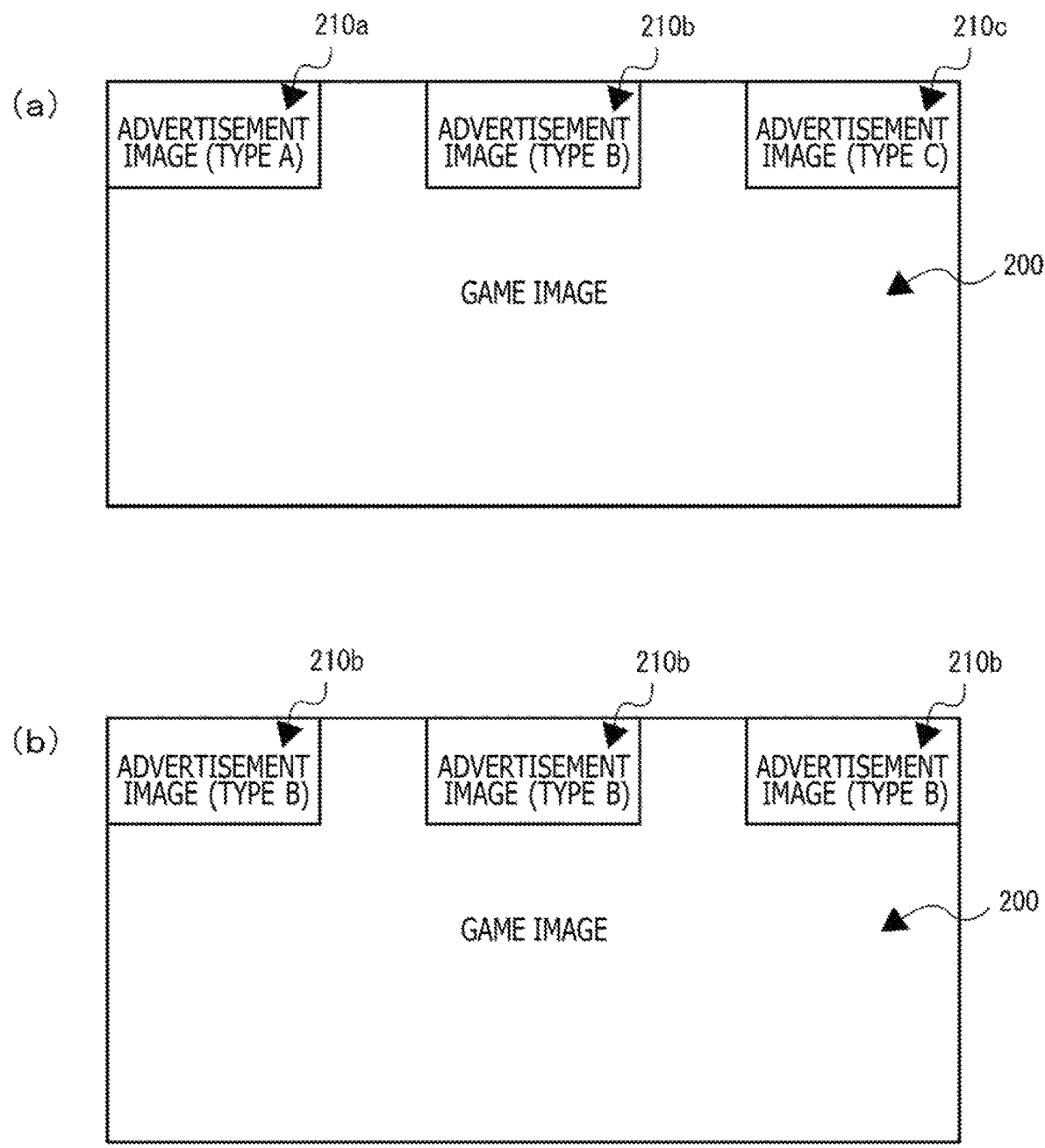

INFORMATION PROCESSING APPARATUS AND IMAGE DISPLAY METHOD

TECHNICAL FIELD

The present invention relates to a technology for displaying an image on a head-mounted display.

BACKGROUND ART

A head-mounted display (HMD) is worn on a user's head and provides the user with a virtual reality (VR) or augmented reality (AR) video world. Recent years have seen a user manipulating a game controller and playing a game while watching a game image displayed on an HMD with the HMD connected to a gaming console. In order to provide a VR image to an entire field of view of the user, HMD is effective in enhancing a sense of immersion of the user into the video world and drastically improving the entertaining factor of games and so on. It is possible to further enhance the sense of immersion into the video world by equipping the HMD with a head tracking function and generating images of a virtual three dimensional space in step with a posture of a user's head.

SUMMARY

Technical Problem

One possibility as a new marketing technique associated with widespread use of HMDs would be to display additional content such as advertisements in a VR space or an AR space. Techniques for effectively presenting such additional content in a VR space or an AR space have yet to be sufficiently proposed.

The present invention has been devised in light of the foregoing problem, and it is an object of the present invention to provide a technology for effectively presenting to a user additional content such as advertisements in a VR space or an AR space.

Solution to Problem

In order to solve the above problem, an information processing apparatus of an aspect of the present invention includes a direction detection section, an image generation section, and a display control section. The direction detection section detects a direction of a line of sight of a user wearing a head-mounted display or an orientation of the user's head. The image generation section generates a first image regarding main content selected by the user as an item to be displayed on the head-mounted display. The display control section causes the head-mounted display to display a second image regarding content different from the main content for promoting recognition of a given thing or service together with the first image. The display control section controls a manner in which the second image is displayed on the head-mounted display in accordance with the direction of the user's line of sight or the orientation of the user's head.

Another aspect of the present invention is an image display method. In this method, a computer performs a step of detecting a direction of a line of sight of a user wearing a head-mounted display or an orientation of the user's head, a step of generating a first image regarding main content selected by the user as an item to be displayed on the head-mounted display, a step of causing the head-mounted display to display a second image regarding content different from the main content for promoting recognition of a given thing or service together with the first image, and a step of controlling a manner in which the second image is displayed on the head-mounted display in accordance with the direction of the user's line of sight or the orientation of the user's head.

It should be noted that arbitrary combinations of the above constituent elements and conversions of expressions of the present invention between a system, a computer program, a recording medium having a computer program recorded in a readable manner, a data structure, and so on are also effective as modes of the present invention.

Advantageous Effect of Invention

The present invention can provide a technology for effectively presenting, to a user, additional content such as advertisements in a VR space or an AR space.

BRIEF DESCRIPTION OF DRAWINGS

FIGS. 5(a) and 5(b) are diagrams schematically illustrating images displayed on the HMD.

FIGS. 6(a) and 6(b) are diagrams schematically illustrating images displayed on the HMD.

FIGS. 8(a) and 8(b) are diagrams schematically illustrating images displayed on the HMD.

DESCRIPTION OF EMBODIMENT

An information processing apparatus of a working example causes a head-mounted display (HMD) worn by a user to display an image regarding main content selected by the user. The main content is a primary piece of content to be displayed on the HMD and includes various pieces of content viewable by the user that are based on data delivered live from an external apparatus or data recorded in the information processing apparatus in question in advance. For example, the main content includes entertainment content such as games, concerts, talk show programs, and so on. In the working example, games are illustrated as the main content.

Also, the information processing apparatus of the working example causes the HMD to display an image regarding content different from the main content for promoting recognition of a given thing or service (hereinafter referred to as "additional content") together with a main content image. The additional content includes advertisements of various things or services and also includes content different from the main content for guiding users to games, concerts, and so on (e.g., link images to games and concerts). Additional content data may be delivered live from an external apparatus or recorded in advance in the information processing apparatus.

Also, the information processing apparatus of the working example controls a manner in which an image of additional content is displayed on an HMD in accordance with a direction of a line of sight of a user wearing the HMD or an orientation of a user's head. For example, the information processing apparatus changes the manner in which an image of additional content is displayed from a first manner to a second manner. This makes it possible to effectively present, to the user, additional content in a VR space and an AR space. In the working example, advertisements are illustrated as additional content. Also, in the working example, VR images are displayed on a non-transmissive HMD. However, the additional content image display technology of the working example is also applicable in a case where AR images are displayed on an optically transmissive HMD.

Figure 1:
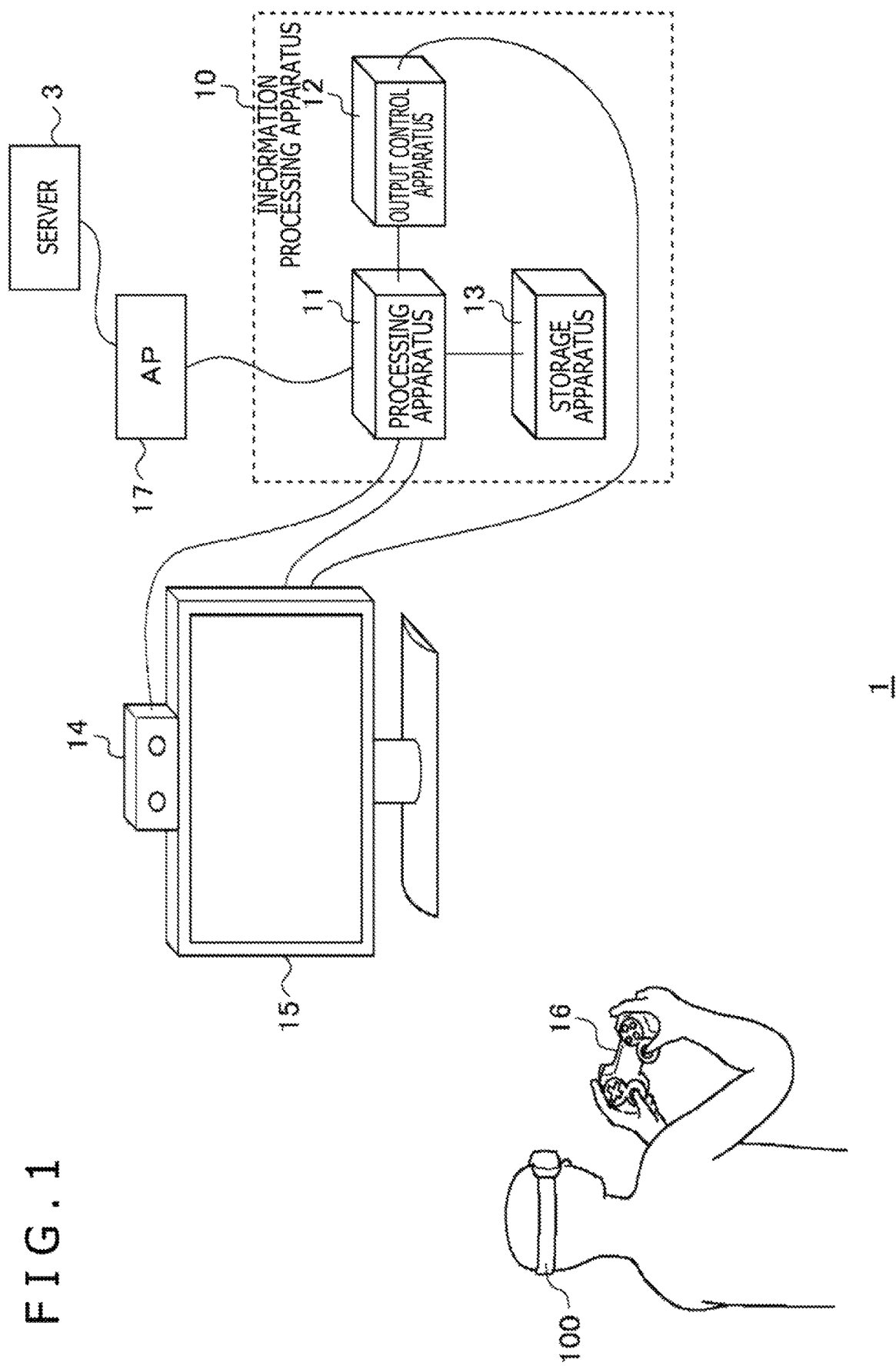
FIG. 1 is a diagram illustrating a configuration example of an information processing system in a working example.

FIG. 1 is a diagram illustrating a configuration example of an information processing system 1 in the working example. The information processing system 1 includes an information processing apparatus 10, an HMD 100, an input apparatus 16, an imaging apparatus 14, and an output apparatus 15. The input apparatus 16 is manipulated by the user with hand fingers. The imaging apparatus 14 shoots the user who is wearing the HMD 100. The output apparatus 15 displays images. The output apparatus 15 may be a television set. The information processing apparatus 10 is connected to an external network such as the Internet via an access point (AP) 17. The AP 17 may have a wireless access point function and a router function, and the information processing apparatus 10 may be connected to the AP 17 by a cable. Alternatively, the information processing apparatus 10 may be connected to the AP 17 through a known wireless communication protocol.

The information processing apparatus 10 of the working example is connected to a server 3 on the external network via the AP 17. The server 3 stores a plurality of types of advertisement data to be displayed on the HMD 100 and sends the plurality of types of advertisement data to the information processing apparatus 10. Advertisement data may include advertisement images and data indicating timings at which to display advertisements and the manner in which to display advertisements.

The HMD 100 is worn on the user's head to provide a virtual reality (VR) video world to the user. It is possible to enhance a sense of immersion into the video world by equipping the HMD 100 with a head tracking function and updating a display image in step with the motion of the user's head.

The information processing apparatus 10 includes a processing apparatus 11, an output control apparatus 12, and a storage apparatus 13. The processing apparatus 11 is a terminal apparatus that accepts operation information input to the input apparatus 16 by the user and executes an application such as a game. The processing apparatus 11 may be connected to the input apparatus 16 by a cable or through a known wireless communication protocol. It should be noted that the processing apparatus 11 of the working example has a function to accept posture information of the HMD 100 as user operation information of the game and allow the game to advance. The output control apparatus 12 is a processing unit that outputs image data generated by the processing apparatus 11 to the HMD 100, and the output control apparatus 12 may be connected to the HMD 100 by a cable or through a known wireless communication protocol.

The imaging apparatus 14 is a stereo camera, shooting the user wearing the HMD 100 at given intervals and supplying a shot image to the processing apparatus 11. The HMD 100 has a marker (tracking light-emitting diode (LED)) for tracking the user's head which will be described later, and the processing apparatus 11 detects the motion of the HMD 100 on the basis of a marker position included in the shot image. It should be noted that the HMD 100 incorporates posture sensors (acceleration sensor and gyro sensor) and that the processing apparatus 11 performs a highly accurate tracking process by acquiring sensor data detected by the posture sensors in conjunction with the use of a marker shot image from the HMD 100. It should be noted that various techniques have been hitherto proposed for the tracking process and that the processing apparatus 11 may adopt any tracking technique as long as the motion of the HMD 100 can be detected.

The user views images with the HMD 100. Therefore, the output apparatus 15 is not necessarily required for the user wearing the HMD 100. However, it is possible for another user to view an image displayed on the output apparatus 15 by providing the output apparatus 15. The output control apparatus 12 or the processing apparatus 11 may cause the output apparatus 15 to display not only the same image as viewed by the user wearing the HMD but also a different image. For example, in a case where the user wearing the HMD and another user play a game together, a game image from the viewpoint of a character of the other user in question may be displayed by the output apparatus 15.

The HMD 100 is a display apparatus that, when worn on the head by the user, displays images on display panels located in front of his or her eyes. The HMD 100 separately displays a left eye image and a right eye image, respectively, on a left eye display panel and a right eye display panel. These images are included in parallax images from the left and right viewpoints, thus realizing stereoscopy. It should be noted that, because the user views the display panels through optical lenses, the information processing apparatus 10 supplies, to the HMD 100, parallax image data that has undergone correction of optical distortion caused by the lenses. This optical distortion correction process may be handled by either the processing apparatus 11 or the output control apparatus 12.

The processing apparatus 11, the storage apparatus 13, the output apparatus 15, the input apparatus 16, and the imaging apparatus 14 may form a conventional game system. In this case, the processing apparatus 11 is a gaming console that executes a game, and the input apparatus 16 is equipment that supplies user operation information to the processing apparatus 11, such as a game controller, a keyboard, a mouse, or a joystick. The storage apparatus 13 stores system software and game software. The information processing system 1 that provides VR images in a virtual three dimensional space to the HMD is built by adding the output control apparatus 12 and the HMD 100 to the constituent elements of this game system.

It should be noted that the functions of the output control apparatus 12 may be incorporated in the processing apparatus 11. That is, processing units of the information processing apparatus 10 may include the processing apparatus 11 alone or the processing apparatus 11 and the output control apparatus 12. In the description given below, the functions of providing VR images to the HMD 100 will be recited altogether as the functions of the information processing apparatus 10.

In the game of the working example, the user character is moved in the virtual three dimensional space on the basis of operation information input from the input apparatus 16 and the direction of the line of sight of the user character is determined on the basis of posture information of the HMD 100 worn on the user's head. Although using the posture information of the HMD 100 as operation information for controlling the direction of the line of sight of the user character in the working example, the game may use input information input to the input apparatus 16 as operation information for controlling the direction of the line of sight. Also, position information of the HMD 100 may be used rather than input information input to the input apparatus 16 as operation information for moving the user character. In the working example, operation information of the user character may be acquired either from the input apparatus 16 or the HMD 100. Alternatively, operation information may be acquired from other user interface.

The information processing apparatus 10 detects position coordinates and a posture of the user's head (actually, the HMD 100) by performing a user head tracking process. Here, the position coordinates of the HMD 100 are position coordinates in the three dimensional space having its origin at a reference position, and the reference position may be position coordinates (longitude and latitude) when the power is turned ON for the HMD 100. Also, the posture of the HMD 100 is an inclination in a triaxial direction relative to a reference posture in the three dimensional space. It should be noted that the reference posture is a posture that provides a level line of sight of the user, and the reference posture at the time of power-on of the HMD 100 may be set.

The information processing apparatus 10 can detect the position coordinates and the posture of the HMD 100 from sensor data detected by the posture sensors of the HMD 100 alone and can further detect, with high accuracy, the position coordinates and the posture of the HMD 100 by performing image analysis on the marker (tracking LED) of the HMD 100 shot with the imaging apparatus 14. As described earlier, the information processing apparatus 10 may calculate the position of the user character in the virtual three dimensional space on the basis of position information of the HMD 100 and calculate the line of sight of the user character on the basis of the posture information of the HMD 100. In the working example, however, the position of the user character in the virtual three dimensional space is calculated on the basis of operation information of the input apparatus 16.

Figure 2:
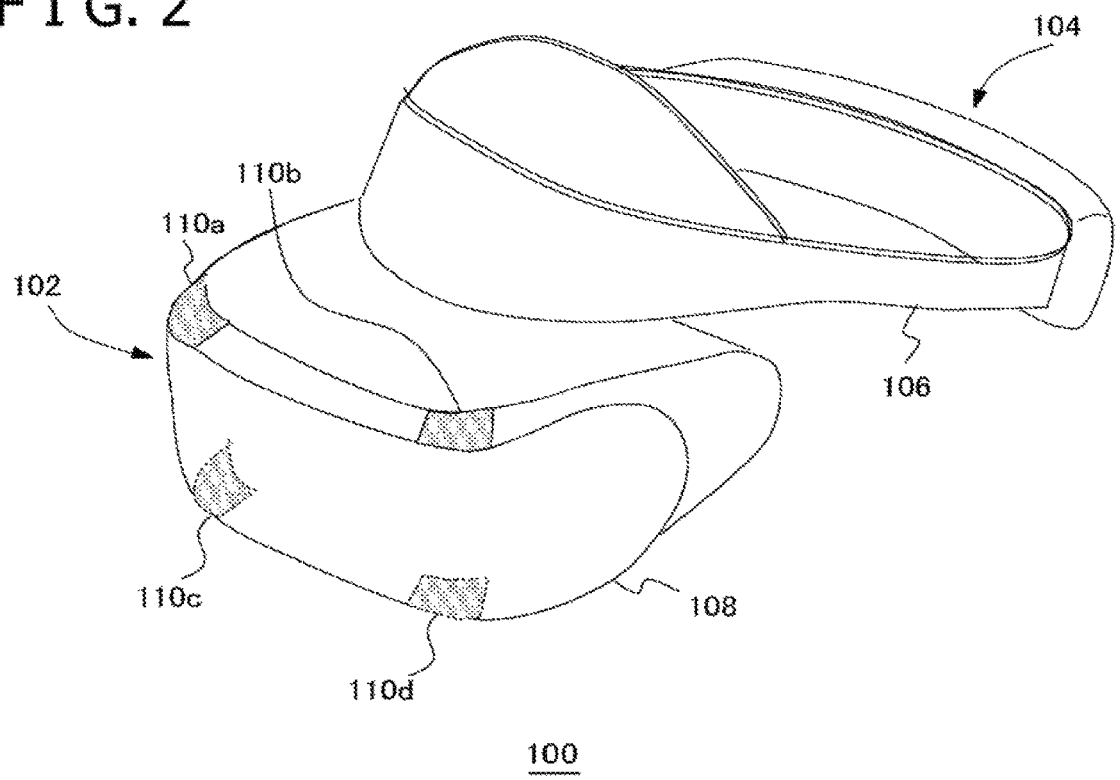
FIG. 2 is a diagram illustrating an example of an outer shape of an HMD.

FIG. 2 illustrates an example of an outer shape of the HMD 100. The HMD 100 includes an output mechanism section 102 and a fitting mechanism section 104. The fitting mechanism section 104 includes a fitting band 106 that goes around the head and fastens the HMD 100 to the head when the HMD 100 is worn by the user. The fitting band 106 has a material or a structure that permits adjustment of its length in accordance with a head circumference.

The output mechanism section 102 includes an enclosure 108 shaped to cover the left and right eyes when the HMD 100 is worn by the user and includes, therein, a display panel that comes face to face with the eyes when the HMD 100 is worn. The display panel may be a liquid crystal panel, an organic electro-luminescence (EL) panel, or other type of panel. The enclosure 108 further includes, therein, a pair of left and right optical lenses located between the display panel and the user's eyes to expand a viewing angle of the user. The HMD 100 may further include speakers and earphones at positions corresponding to the user's ears, and an external headphone may be connected thereto.

Light-emitting markers 110a, 110b, 110c, and 110d are provided on an outer surface of the enclosure 108. Although tracking LED markers are included in the light-emitting markers 110 in this example, other types of markers may also be included. In any case, any type of markers may be included as long as they can be shot with the imaging apparatus 14 to allow the information processing apparatus 10 to perform image analysis of the marker positions. The light-emitting markers 110 are not specifically limited in number or arrangement. However, the number and arrangement thereof are required to permit detection of the posture of the HMD 100, and the light-emitting markers 110 are provided at four corners on the front surface of the enclosure 108 in the example illustrated. Further, the light-emitting markers 110 may be provided on a side or rear portion of the fitting band 106 to permit shooting when the user turns his or her back on the imaging apparatus 14.

The HMD 100 may be connected to the information processing apparatus 10 by a cable or through a known wireless communication protocol. The HMD 100 sends sensor data detected by the posture sensors to the information processing apparatus 10 and receives image data generated by the information processing apparatus 10 and displays the image data on the left eye display panel and the right eye display panel.

Figure 3:
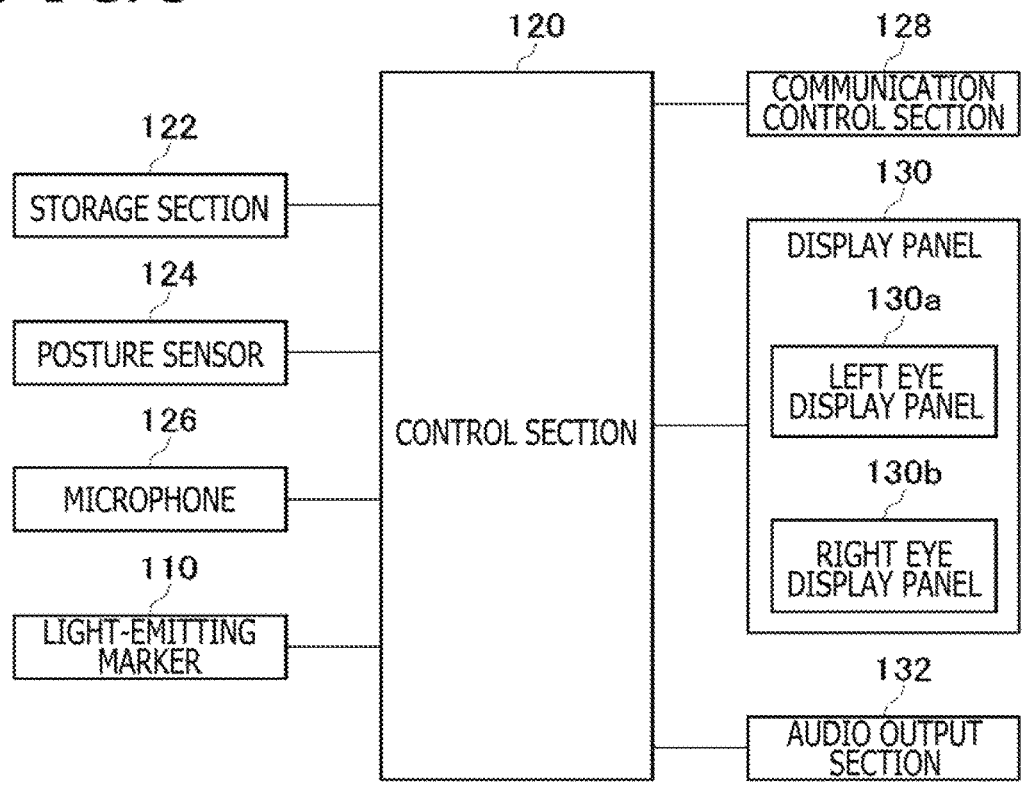
FIG. 3 is a diagram illustrating functional blocks of the HMD.

FIG. 3 illustrates functional blocks of the HMD 100. A control section 120 is a main processor that processes various types of data such as image data, sound data, and sensor data, and instructions and outputs processing results. A storage section 122 temporarily stores data and instructions to be processed by the control section 120. A posture sensor 124 detects posture information of the HMD 100. The posture sensor 124 includes at least a triaxial acceleration sensor and a triaxial gyro sensor.

A communication control section 128 sends data output from the control section 120 to the external information processing apparatus 10 via a network adapter or an antenna through wired or wireless communication. The communication control section 128 also receives data from the information processing apparatus 10 via a network adapter or an antenna through wired or wireless communication and outputs the data to the control section 120.

When image data and sound data are received from the information processing apparatus 10, the control section 120 supplies the data to the display panel 130 to display the image and supplies to a sound output section 132 to output the sound. The display panel 130 includes a left eye display panel 130a and a right eye display panel 130b to display a pair of parallax images on the display panels, respectively. Also, the control section 120 causes sensor data from the posture sensor 124 and sound data from a microphone 126 to be sent to the information processing apparatus 10 from the communication control section 128.

Figure 4:
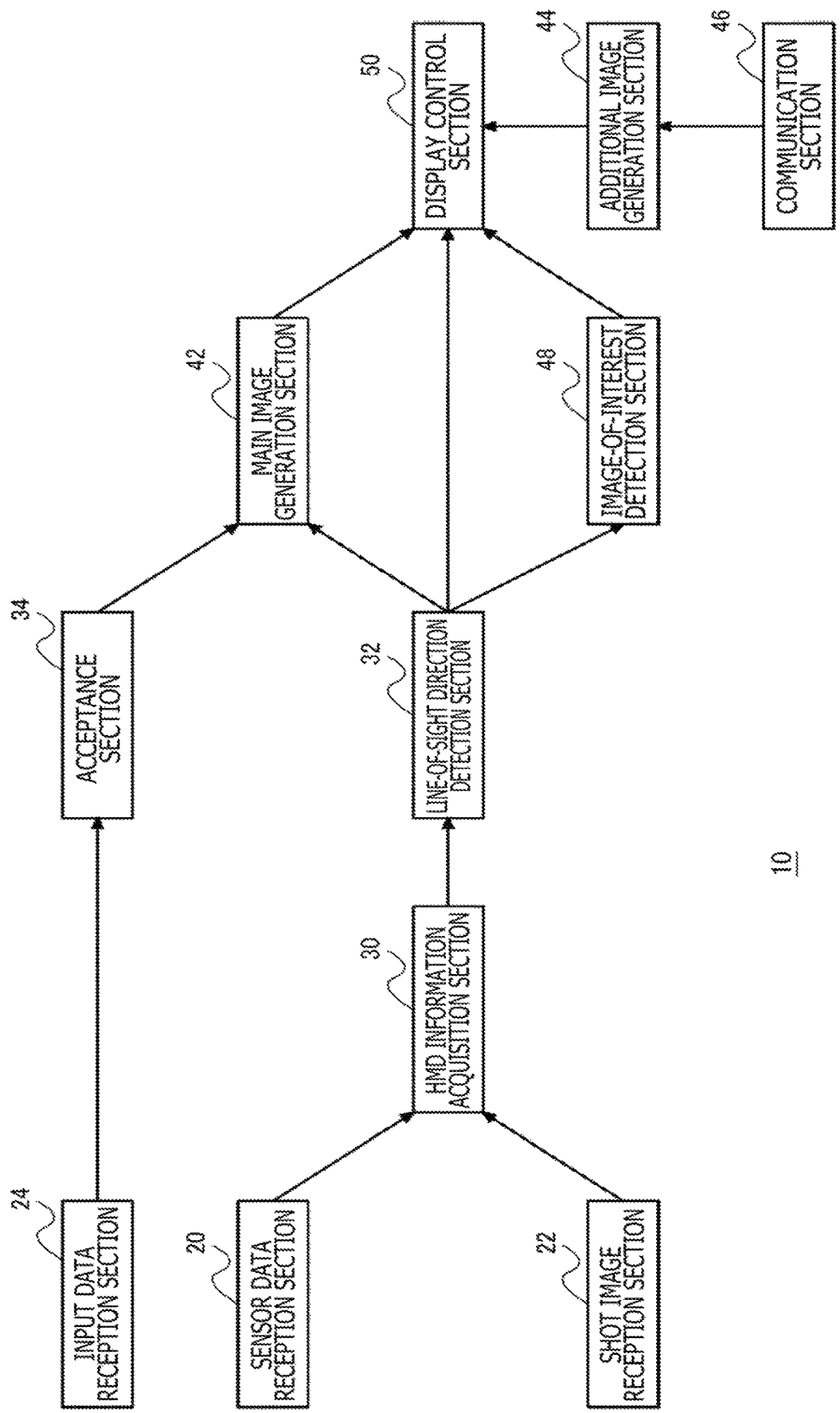
FIG. 4 is a diagram illustrating functional blocks of an information processing apparatus.

FIG. 4 illustrates functional blocks of the information processing apparatus 10. The information processing apparatus 10 includes, as input/output interfaces with external equipment, a sensor data reception section 20, a shot image reception section 22, an input data reception section 24, a display control section 50 and a communication section 46. The information processing apparatus 10 further includes an HMD information acquisition section 30, a line-of-sight direction detection section 32, an acceptance section 34, a main image generation section 42, an additional image generation section 44, and an image-of-interest detection section 48.

In FIG. 4, each element described as a functional block for performing various processes can include, in terms of hardware, circuit blocks, memories, and other large scale integrations (LSIs), and, is realized, in terms of software, by a program loaded into the memory, and so on. Therefore, it is to be understood by those skilled in the art that these functional blocks can be realized in various ways by hardware alone, software alone, or a combination thereof and are not limited to any one of them. For example, a computer program including a plurality of modules corresponding to the plurality of functional blocks illustrated in FIG. 4 may be installed in a storage (e.g., storage apparatus 13) of the information processing apparatus 10. A central processing unit (CPU) or a graphics processing unit (GPU) of the information processing apparatus 10 may deliver the function of each of the functional blocks illustrated in FIG. 4 by loading the computer program into the main memory and executing the program.

A description will be given below of operation of the information processing apparatus 10 when images of a first person shooter (FPS) game are generated. The main image generation section 42 determines the manners in which a left eye game image and a right eye game image are displayed. The display control section 50 provides each of the game images to the HMD 100 and causes the display panel 130 to display these images.

The sensor data reception section 20 receives sensor data from the posture sensor 124 of the HMD 100 worn by the user at given intervals and supplies the sensor data to the HMD information acquisition section 30. The shot image reception section 22 receives a shot image of the HMD 100 from the imaging apparatus 14 at given intervals and supplies the shot image to the HMD information acquisition section 30. For example, the imaging apparatus 14 shoots a space in the front every 1/60 of a second, and the shot image reception section 22 receives a shot image every 1/60 of a second. In the working example, the HMD information acquisition section 30 acquires sensor data and a shot image as posture information representing the posture of the HMD 100 worn on the user's head. The HMD information acquisition section 30 supplies the acquired posture information to the line-of-sight direction detection section 32.

The line-of-sight direction detection section 32 detects the direction of the user's line of sight in accordance with the posture information of the HMD 100, in other words, determines the direction of the user's line of sight. Specifically, the HMD information acquisition section 30 detects the change in posture of the HMD 100 from sensor data of the posture sensor 124. At this time, the HMD information acquisition section 30 may identify the change in posture of the HMD 100 from the sensor data of the triaxial gyro sensor. It should be noted that the HMD information acquisition section 30 preferably enhances the accuracy at which the change in posture is detected by further using shooting results of the tracking light-emitting markers 110. The line-of-sight direction detection section 32 provides the detected direction of the line of sight to the main image generation section 42, the image-of-interest detection section 48, and the display control section 50.

The input data reception section 24 receives key data input by the user from the input apparatus 16 and supplies the key data to the acceptance section 34. The acceptance section 34 provides the key data to the main image generation section 42 as operation information of the game.

The main image generation section 42 uses the direction of the line of sight provided from the line-of-sight direction detection section 32 as operation information that defines the line of sight of the user character. Also, the main image generation section 42 uses the key data supplied from the acceptance section 34 as operation information that defines the action of the user character. A known technology may be used to perform the process of moving the character in the virtual three dimensional space by manipulating the input apparatus 16. The main image generation section 42 moves the user character in the virtual three dimensional space and performs a rendering process of the virtual three dimensional space on the basis of the user character's position (coordinates in the virtual three dimensional space) and the direction of the line of sight. For example, the main image generation section 42 may generate game images in the virtual three dimensional space displayed on the HMD 100 by installing, at the user character's position, a virtual camera whose optical axis runs in the direction of the line of sight of the user character and acquiring images of the virtual camera.

In the FPS game of the working example, the direction of the character's line of sight can be changed by the user by moving the character through key input on the input apparatus 16 and moving the orientation of the HMD 100. In this game, the user can move and look in all 360-degree directions, and in that sense, the HMD 100 is used as a display apparatus capable of displaying the virtual space of the game in all directions.

The communication section 46 communicates with the server 3 via the AP 17. The communication section 46 of the working example receives advertisement data sent from the server 3. The communication section 46 may receive advertisement image data itself from the server 3.

The image-of-interest detection section 48 detects, of the plurality of advertisement images displayed on the HMD 100, an advertisement image whose display position on the HMD 100 has a high degree of match with the direction of the user's line of sight as an image of interest. For example, the image-of-interest detection section 48 may measure, for each of the plurality of advertisement images displayed on the HMD 100, a period of time during which the display position matches the direction of the user's line of sight (hereinafter referred to as "duration of interest"). The image-of-interest detection section 48 may detect, as an image of interest, the advertisement image whose duration of interest is equal to or longer than a threshold value. An appropriate value may be determined as this threshold value on the basis of the knowledge and experience of the developer, experiments conducted by using the information processing system 1, and so on. For example, the above threshold value may be five seconds.

The additional image generation section 44 generates, as an additional content image, an advertisement image to be displayed on the HMD 100 on the basis of advertisement data stored in advance in the information processing apparatus 10 or advertisement data sent from the server 3. The additional image generation section 44 outputs generated advertisement image data to the display control section 50. For example, the additional image generation section 44 may select, from among a plurality of types of advertisement data, a piece of advertisement data to be displayed and generate an advertisement image for promoting the sales of a specific thing or service on the basis of the selected piece of data. It should be noted that, in a case where the advertisement data is provided from the server 3, the additional image generation section 44 may output the advertisement image provided by the server 3 in an 'as-is' manner.

The display control section 50 sends a game image generated by the main image generation section 42 to the HMD 100 and causes the HMD 100 to display the game image. In parallel thereto, the display control section 50 sends an advertisement image generated by the additional image generation section 44 to the HMD 100 and causes the HMD 100 to display the advertisement image.

Also, the display control section 50 determines a display position of the advertisement image on the HMD 100, in other words, determines a display position (e.g., coordinates) of the advertisement image in the virtual three dimensional space displayed on the HMD 100. The display control section 50 controls the HMD 100 in such a manner as to display an advertisement image at the display position of the HMD 100, in other words, at the display position in the virtual three dimensional space. The display control section 50 may cause an advertisement image to be superimposed on part of the game image region.

Also, the display control section 50 controls the manner in which an advertisement image is displayed on the HMD 100 in accordance with the direction of the user's line of sight detected by the line-of-sight direction detection section 32. For example, the display control section 50 may change a thing or a service whose sales or recognition is to be promoted by the advertisement image, in other words, change the thing or the service indicated by the advertisement image. Instead thereof, or together therewith, the display control section 50 may change whether or not an advertisement image is displayed on the HMD 100 or may change the display position thereof in accordance with the direction of the user's line of sight.

A description will be given below of the manner in which an advertisement image that matches the direction of the user's line of sight is displayed. A plurality of manners described below may be used in an arbitrary combination. Also, the display control section 50 may perform a plurality of types of control processes in parallel in relation to the manner of displaying an advertisement image.

(First Aspect)

In a case where the display position of an advertisement image on the HMD 100 continues to match the direction of the user's line of sight for a given period of time, the display control section 50 may hide the advertisement image that has been displayed up to that moment. In a case where an advertisement image is hidden, the display control section 50 may send a game image clear of the advertisement image to the HMD 100 and cause the HMD 100 to display the game image. An appropriate value may be determined as the given period of time, a threshold value for hiding the advertisement image, on the basis of the knowledge and experience of the developer, experiments conducted by using the information processing system 1, and so on. For example, the above threshold value may be five seconds.

FIGS. 5(a) and 5(b) schematically illustrate images displayed on the HMD 100. As illustrated in FIG. 5(a), the display control section 50 of the working example selects a top center of the screen of the HMD 100 as an initial display position of an advertisement image 202. It should be noted that the display control section 50 may display the advertisement image 202 at a top center region of a game image 200 when the advertisement image 202 initially appears.

The display control section 50 may store, in advance, correspondence between a plurality of types of directions of user's line of sight and a plurality of regions of the screen of the HMD 100. In a case where a specific direction of the line of sight is detected, the display control section 50 may identify the screen region corresponding to the line of sight (i.e., the region viewed by the user). The display control section 50 may measure the period of time during which the direction of the user's line of sight matches the display position (in other words, the display region) of the advertisement image 202, and in the example illustrated in FIG. 5(a), the period of time during which the user's line of sight points at the top center of the screen of the HMD 100 (hereinafter referred to as "duration of interest"). In a case where the duration of interest in the advertisement image 202 that currently appears is equal to or longer than the above threshold value, the display control section 50 may hide the advertisement image 202. FIG. 5(b) illustrates a state in which the advertisement image 202 depicted in FIG. 5(a) is hidden.

In this aspect, when it is confirmed that the user has viewed an advertisement in the virtual three dimensional space for a certain period of time, the advertisement in question is automatically erased. This allows the user to perceive an advertised item on one hand, and on the other hand, makes it easier to avoid the user from feeling bothered to watch the advertisement image.

(Second Aspect)

The additional image generation section 44 may generate video data (in other words, a video advertisement) as an advertisement image or acquire video data from the server 3 as an advertisement image. In a case where the direction of the user's line of sight matches the display position of an advertisement image on the HMD 100, the display control section 50 may start reproduction of the video advertisement. For example, the display control section 50 may sequentially send a plurality of advertisement images corresponding to a plurality of elapsed times (in other words, a plurality of advertisement images of video reproduction results) to the HMD 100 from the beginning of reproduction and cause the HMD 100 to display the plurality of these advertisement images.

In a case where the direction of the user's line of sight does not match the display position of an advertisement image on the HMD 100, the display control section 50 may suppress the reproduction of a video advertisement. Also, the display control section 50 may start the reproduction of a video advertisement in a case where the period of time during which the direction of the user's line of sight matches the display position of the video advertisement that is standing still on the HMD 100 (the above duration of interest) is equal to or longer than a given threshold value (e.g., two seconds). In other words, the display control section 50 may suppress the reproduction of a video advertisement in a case where the above duration of interest is shorter than a given threshold value. Also, the display control section 50 may control the HMD 100 to hide the video advertisement that has been displayed up to that moment in a case where the reproduction of the video advertisement ends.

FIGS. 6(a) and 6(b) schematically illustrate images displayed on the HMD 100. As illustrated in FIG. 6(a), the display control section 50 of the working example displays a video advertisement 204 in a standing-still manner when the video advertisement 204 is initially displayed. For example, the display control section 50 may cause a still image representing a first frame of the video advertisement 204 (in other words, image displayed when the reproduction starts) to be displayed. The display control section 50 may start the reproduction of the video advertisement 204 in a case where the direction of the user's line of sight matches the display position of the video advertisement 204 and, for example, in a case where the user's line of sight points at the top center of the screen of the HMD 100. FIG. 6(b) illustrates that the video advertisement 204 being reproduced is displayed.

If a video advertisement is reproduced at all times, one may be hindered from viewing a game image which is main content. Also, in a case where communication with an external apparatus takes place during reproduction of a video advertisement, and constant reproduction of the video advertisement leads to increased communication traffic. In the second aspect, the reproduction of a video advertisement is triggered by the fact that the user takes a look at the advertisement in the virtual three dimensional space, thus avoiding the above detrimental effects and effectively presenting the video advertisement to the user.

(Third Aspect)

The display control section 50 may switch content of an advertisement image to a piece of content different from previous ones in a case where the direction of the user's line of sight continues to match the display position of an advertisement image for a given period of time or more in the HMD 100. In this switching process, the display control section 50 may terminate the display of a second image advertising a first thing and, at the same time, initiate the display of a second image advertising a second thing different from the first thing. An appropriate value may be determined as the above given period of time which is a threshold value for changing content of an advertisement image, on the basis of the knowledge and experience of the developer, experiments conducted by using the information processing system 1, and so on. For example, the above given period of time may be five seconds.

Figure 7:
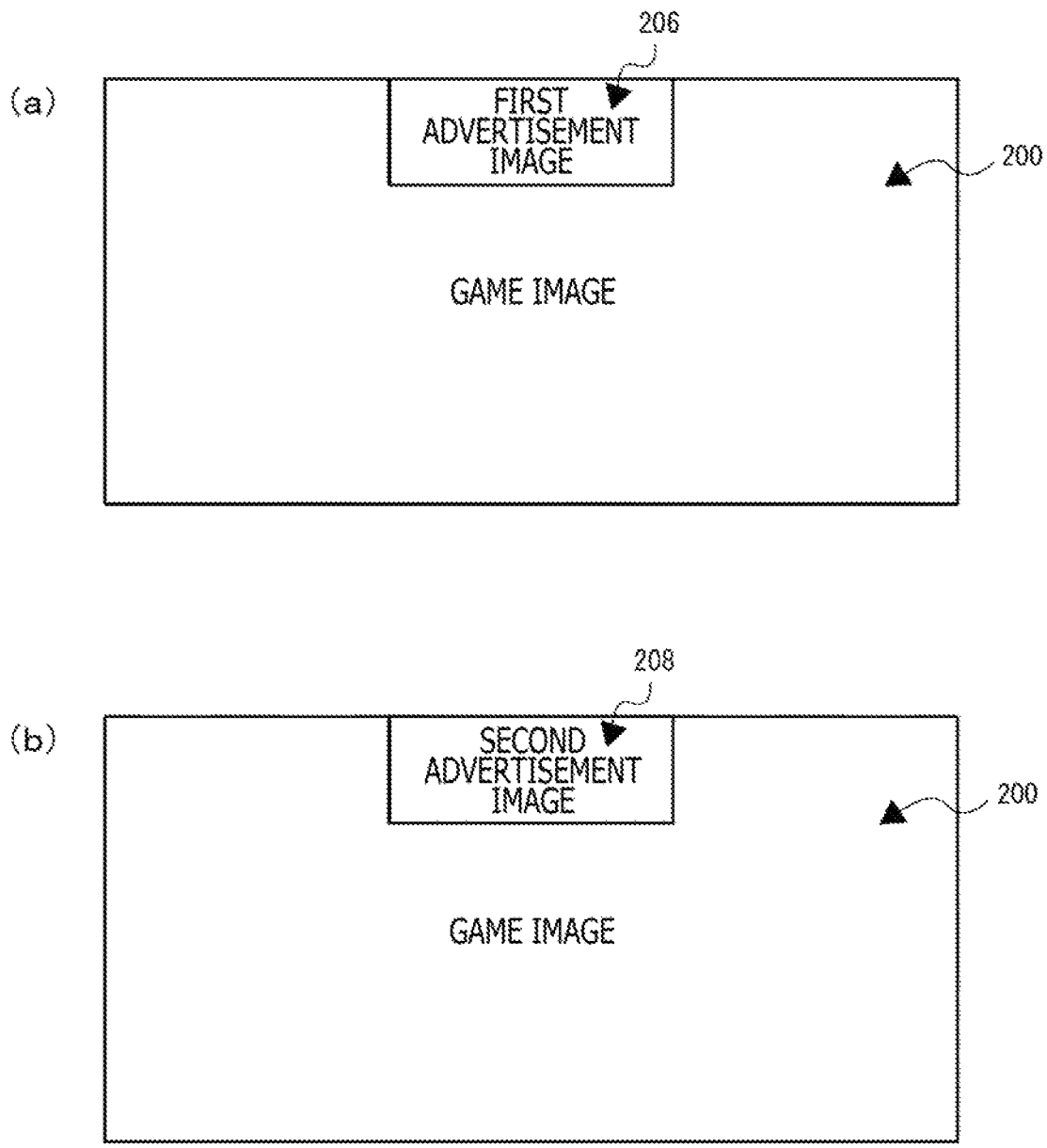
FIGS. 7(a) and 7(b) are diagrams schematically illustrating images displayed on the HMD.

FIGS. 7(*a*) and 7(*b*) schematically illustrate images displayed on the HMD 100. As illustrated in FIG. 7(*a*), the display control section 50 of the working example displays a first advertisement image 206 at the top center in the screen of the HMD 100. The first advertisement image 206 includes, for example, content advertising a first thing.

The display control section 50 may measure the period of time during which the direction of the user's line of sight matches the display position of the advertisement image 206, i.e., the period of time (duration of interest) during which the user's line of sight points at the top center of the screen of the HMD 100. In a case where the duration of interest in the first advertisement image 206 is equal to or longer than the above threshold value, the display control section 50 may display a second advertisement image 208 whose details advertise a thing different from the first thing instead of the first advertisement image 206. FIG. 7(*b*) illustrates a state in which the target to be displayed on the HMD 100 has been switched from the first advertisement image 206 to the second advertisement image 208.

Even if an advertisement with the same details is continuously displayed, the advertisement may turn out to be ineffective in some cases, due, for example, to the fact that the user's interest lies in something else. In the third aspect, if the user looks at an advertisement for a certain period of time, the advertisement will be switched to another one. This makes it possible to present advertisements effectively to a number of users having various kinds of interests and values.

(Fourth Aspect)

The display control section 50 may display a plurality of advertisement images depicting a plurality of types of content on the HMD 100. The types of content that can be set in advertisement images can also be said to be categories of advertised items and may be classified, for example, into games, concerts, television programs, events, and so on. A plurality of advertisement images include, at least, two advertisement images that differ in thing or service to be advertised. The plurality of advertisement images may include, for example, a first advertisement image advertising a game, a second advertisement image advertising a concert, and a third advertisement image advertising a television program.

In a case where an image of interest is detected from among a plurality of advertisement images by the image-of-interest detection section 48, the display control section 50 may preferentially set, of a plurality of types of content indicated by the plurality of advertisement images, the type of content indicated by the image of interest for a plurality of advertisement images. For example, the display control section 50 may set the type of content indicated by the image of interest for all or more than half of the plurality of advertisement images that are displayed simultaneously on the HMD 100.

FIGS. 8(*a*) and 8(*b*) schematically illustrate images displayed on the HMD 100. In the example illustrated in FIG. 8(*a*), the display control section 50 causes the HMD 100 to display an advertisement image 210*a* (e.g., game), an advertisement image 210*b* (e.g., concert), and an advertisement image 210*c* (e.g., television program) whose advertised items are different. It is assumed here that the image-of-interest detection section 48 has detected the advertisement image 210*b* as an image of interest. The display control section 50 sets the category of the advertised item that is indicated by the advertisement image 210*b* depicted in FIG. 8(*a*) for a plurality of advertisement images. In the example illustrated in FIG. 8(*b*), the display control section 50 has switched all three advertisement images to the advertisement image 210*b* (e.g., advertisement images depicting three concerts).

In this aspect, it is possible to learn the user's preferences from the direction of the user's line of sight and present advertisements tailored to his or her preferences.

(Fifth Aspect)

The display control section 50 may change the display position of an advertisement image in such a manner as to display the advertisement image in a region of the display region of the HMD 100 that matches the direction of the user's line of sight (can also be said to be a center of the line of sight) detected by the line-of-sight direction detection section 32. For example, the display control section 50 may identify, from among a plurality of display regions obtained by dividing the screen of the HMD 100, a region that matches the user's line of sight. In a case where the region that currently displays an advertisement image is different from the identified region described above, the display control section 50 may change the display position of the advertisement image in such a manner as to display the advertisement image in the identified region.

Figure 9:
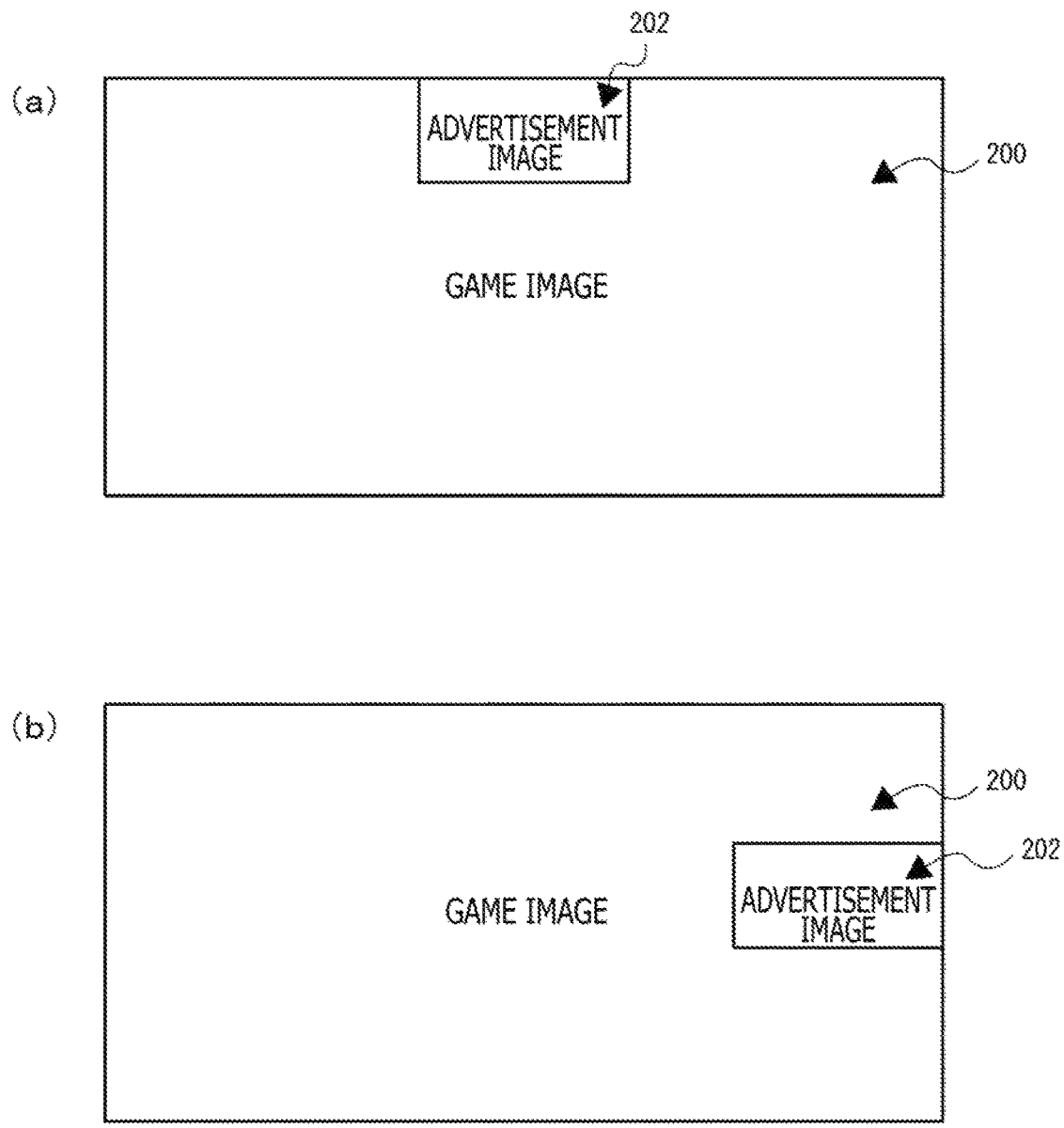
FIGS. 9(a) and 9(b) are diagrams schematically illustrating images displayed on the HMD.

FIGS. 9(*a*) and 9(*b*) schematically illustrate images displayed on the HMD 100. As illustrated in FIG. 9(*a*), the display control section 50 of the working example selects the top center of the screen of the HMD 100 as an initial display position of the advertisement image 202. It should be noted that the display control section 50 may display the advertisement image 202 at the top center region of the game image 200 when the advertisement image 202 initially appears.

It is assumed here that the direction of the line of sight detected by the line-of-sight direction detection section 32 matches a center right portion of the screen of the HMD 100. As illustrated in FIG. 9(*b*), the display control section 50 changes the display position of the advertisement image 202 from the top center to the center right. For example, the display control section 50 may initiate the display of the advertisement image 202 at the center right of the screen of the HMD 100 while at the same time, terminating the display of the advertisement image 202 at the top center of the screen of the HMD 100.

In this aspect, it is possible to arrange an advertisement image where the image will be definitely viewed by the user, further enhancing a user's degree of recognition of an advertised item.

As a modification example, in a case where the user's line of sight remains in a specific region of the screen of the HMD 100 for a given period of time or more, the display control section 50 may change the display position of an advertisement image in such a manner as to display an advertisement image in that specific region. For example, the display control section 50 may determine the region in question as a display position of an advertisement image in a case where the region of the screen that matches the user's line of sight remains unchanged for a given period of time or more. An appropriate value may be determined as the above given period of time on the basis of the knowledge and experience of the developer, experiments conducted by using the information processing system 1, and so on. For example, the above given period of time may be three seconds. In this modification example, it is possible to arrange an advertisement image where the image will be definitely viewed by the user and suppress a frequency at which the display position of an advertisement image is changed.

(Sixth Aspect)

The display control section 50 may change the display position of an advertisement image in the display region of the HMD 100 in such a manner as to display the advertisement image in a region different from the region that matches the direction of the user's line of sight (can also be said to be the center of the line of sight) detected by the line-of-sight direction detection section 32. The region different from the region that matches the direction of the user's line of sight can also be said to be region corresponding to a periphery (can also be said to be an outer edge) of the direction of the user's line of sight (can also be said to be the center of the line of sight). It can also be said that the region avoids the user's line of sight. It should be noted that, if an advertisement image is being displayed in a region different from the region that matches the direction of the user's line of sight, the display control section 50 may maintain the display position of the advertisement image in question unchanged.

Figure 10:
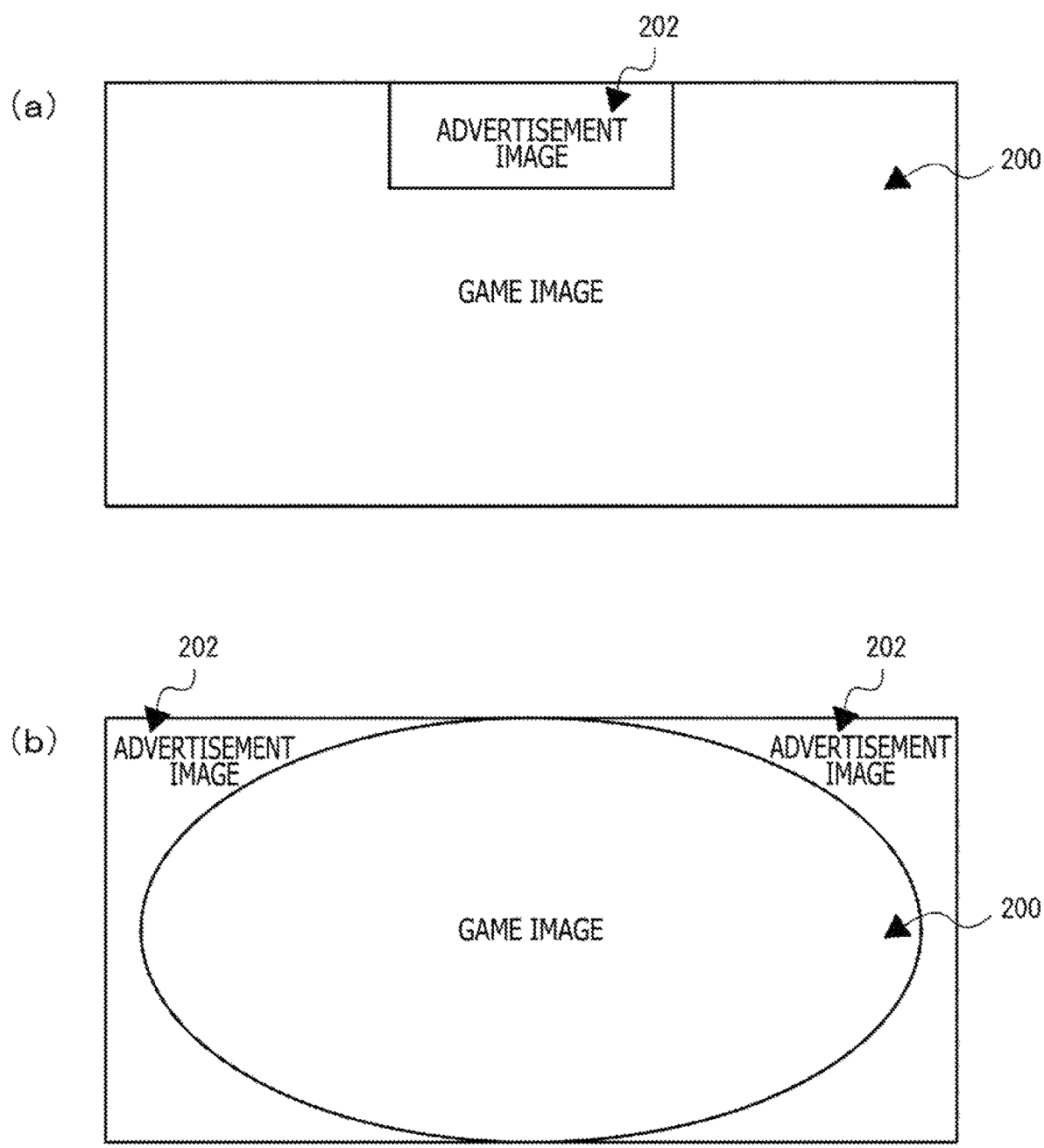
FIGS. 10(a) and 10(b) are diagrams schematically illustrating images displayed on the HMD.

FIGS. 10(*a*) and 10(*b*) schematically illustrate images displayed on the HMD 100. As illustrated in FIG. 10(*a*), the display control section 50 of the working example selects the top center of the screen of the HMD 100 as an initial display position of the advertisement image 202. It is assumed here that the direction of the line of sight detected by the line-of-sight direction detection section 32 matches the center of the screen of the HMD 100. The display control section 50 changes the display position of the advertisement image 202 to a position that avoids the screen center. For example, the display control section 50 may change the display position to a perimeter portion of the screen (in other words, position near any of four corners).

If an image of main content in which an advertisement image is displayed becomes difficult to see, there is a possibility that the user may develop a sense of disgust. In the sixth aspect, by arranging an advertisement image in such a manner as to avoid the center of the line of sight, it is possible to gradually nurture the user's interest in the advertised item while, at the same time avoiding the user from developing a sense of disgust.

The present invention has been described above on the basis of a working example. It is to be understood by those skilled in the art that this working example is illustrative, that various modification examples are possible in terms of a combination of constituent elements and processes, and that these modification examples also fall within the scope of the present invention.

Although not described in the above working example, the HMD 100 may incorporate a known apparatus that shoots the user's eyes with a camera and detects the direction of the user's line of sight on the basis of the shot image (will be referred to as a "line-of-sight sensor" here). The HMD 100 may send, to the information processing apparatus 10, line-of-sight sensor data indicating the user's line of sight, the data output from the line-of-sight sensor. The sensor data reception section 20 of the information processing apparatus 10 may receive line-of-sight sensor data, and the HMD information acquisition section 30 may output, to the line-of-sight direction detection section 32, posture information including the line-of-sight sensor data. The line-of-sight direction detection section 32 may detect the direction of the user's line of sight on the basis of line-of-sight sensor data included in posture information.

The information processing apparatus 10 of the above working example controls the manner in which an additional content image (advertisement image) is displayed on the HMD 100 in accordance with the direction of the line of sight of the user wearing the HMD 100. As a modification example, the information processing apparatus 10 may include, rather than the line-of-sight direction detection section 32, a head orientation detection section that detects an orientation of the user's head on the basis of posture information acquired from the HMD information acquisition section 30. The orientation of the user's head may be an angle from a predetermined reference orientation. The main image generation section 42, the image-of-interest detection section 48, and the display control section 50 of the information processing apparatus 10 may perform the processes described in the working example in accordance with the orientation of the user's head rather than the direction of the user's line of sight.

In the above working example, the information processing apparatus 10 determines whether or not an advertisement image is displayed on the screen of the HMD 100, and the type and position of the image displayed. As a modification example, the HMD 100 may perform this decision-making process. As another modification example, the server 3 may perform this decision-making process. In this case, the HMD 100 or the server 3 may include the functions of the information processing apparatus 10 described in the working example (e.g., FIG. 4). For example, the HMD 100 or the server 3 may include the functions of the HMD information acquisition section 30, the line-of-sight direction detection section 32, the additional image generation section 44, the image-of-interest detection section 48, and the display control section 50 which are described in the working example.

Although not described in the above working example, the information processing apparatus 10 may further include, as a modification example, a region-of-interest detection section that detects, of a plurality of regions of the game image 200 which is main content, a region that matches the direction of the user's line of sight or the orientation of the user's head as a region of interest. The display control section 50 may switch the content of the advertisement image 202 to a piece of content corresponding to the region of interest.

A description will be given of a specific configuration of this modification example. In data of the game image 200 to be displayed on the HMD 100, identification data is associated in advance with at least one of a plurality of regions obtained by dividing the game image 200. The identification data represents an object (e.g., person, thing, character) drawn in the region. Identification data of the object existing in each region may be associated for each frame of the game image 200 or for each group of a given number of frames.

The above region-of-interest detection section detects, as a region of interest, a region that matches the direction of the user's line of sight detected by the line-of-sight direction detection section 32, of the plurality of regions obtained by dividing the game image 200. The region-of-interest detection section may store correspondence between a plurality of directions of the line of sight and a plurality of screen regions. The region-of-interest detection section may identify a screen region that matches the direction of the line of sight and detect the region of the game image 200 displayed in the identified screen region as a region of interest. The information processing apparatus 10 further includes a preference detection section that detects user's preferences in accordance with the region of interest detected by the region-of-interest detection section. The preference detection section detects the object associated with the region of interest detected by the region-of-interest detection section as an item representing the user's preference, in other words, an item that matches the user's preference.

Identification information of an object likely to be displayed in the game image 200 is associated in advance with each of the plurality of advertisement images 202. For example, the advertisement image 202 associated with an object may display advertisement content including that object. The display control section 50 selects the advertisement image 202 that matches the user's preference detected by the preference detection section and that corresponds, for example, to the object in the region of interest, thus causing the HMD 100 to display the advertisement image 202.

In this modification example, it is possible to cause the HMD 100 to display an advertisement that further matches the user's preference as additional content. For example, in a case where main content is a concert picture with a plurality of performers appearing at the same time, it is possible to detect on which performer the user is focusing his or her attention and then change the advertisement in accordance with the performer of interest. For example, it is possible to render the advertisement further effective by displaying the advertisement that is associated with the performer on which the user is focusing his or her attention and in which the performer advertises a thing or a service.

An arbitrary combination of the working example and the modification examples described above is also useful as an embodiment of the present disclosure. New embodiment created as a result of the combination offers the respective effects of the working example and the modification example combined. Also, it is to be understood by those skilled in the art that the function to be delivered by each of constituent requirements recited in claims is realized by each of the constituent elements alone or the constituent elements working in concert with one another, the constituent elements described in the working example and the modification example.

REFERENCE SIGNS LIST

10 Information processing apparatus, 32 Line-of-sight direction detection section, 42 Main image generation section, 44 Additional image generation section, 48 Image-of-interest detection section, 50 Display control section, 100 HMD.

INDUSTRIAL APPLICABILITY

The present invention is applicable to an apparatus or a system for controlling display on a head-mounted display.

The invention claimed is:

1. An information processing apparatus comprising:
a direction detection section detecting a direction of a line of sight of a user wearing a head-mounted display or an orientation of the user's head;
an image generation section generating a first image regarding main content selected by the user as an item to be displayed on the head-mounted display,
wherein the first image is a full screen game image of a video game;
a display control section causing the head-mounted display to display a second image regarding content different from the main content for promoting recognition of a given thing or service together with the first image generated by the image generation section,
wherein the display control section controls a manner in which the second image is displayed on the head-mounted display in accordance with the direction of the user's line of sight or the orientation of the user's head which is detected by the direction detection section; and
a region-of-interest detection section detecting, of a plurality of regions of the first image, a region within the first image that matches the direction of the user's line of sight or the orientation of the user's head as a region of interest,
wherein the display control section switches the content of the second image to a piece of content related to content identified in the full screen game image within the region of interest.

2. The information processing apparatus according to claim 1, wherein
in a case where the direction of the user's line of sight or the orientation of the user's head continues to match a display position of the second image on the head-mounted display for a given period of time, the display control section automatically hides the second image.

3. The information processing apparatus according to claim 1, wherein
the second image is video, and
in a case where the direction of the user's line of sight or the orientation of the user's head matches the display position of the second image on the head-mounted display, the display control section starts reproduction of the second image.

4. The information processing apparatus according to claim 1, wherein
in a case where the direction of the user's line of sight or the orientation of the user's head continues to match the display position of the second image on the head-mounted display for a given period of time, the display control section switches content of the second image to a piece of content different from previous ones.

5. The information processing apparatus according to claim 1, further comprising:
an image-of-interest detection section, wherein
the display control section causes the head-mounted display to display a plurality of second images representing a plurality of types of content different from the main content,
the image-of-interest detection section detects, of the plurality of second images, the second image whose display position on the head-mounted display has a high degree of match with the direction of the user's line of sight or the orientation of the user's head as an image of interest, and in a case where the image of interest is detected, the display control section preferentially sets, of the plurality of types of content, a type of content indicated by the image of interest for the plurality of second images.

6. The information processing apparatus according to claim 1, wherein
the display control section changes the display position of the second image on the head-mounted display in accordance with the direction of the user's line of sight or the orientation of the user's head.

7. The information processing apparatus according to claim 6, wherein
the display control section changes the display position of the second image in such a manner as to display the second image in a region of a display region of the head-mounted display that matches the direction of the user's line of sight or the orientation of the user's head.

8. The information processing apparatus according to claim 6, wherein
the display control section moves the second image to a location within the direction of the user's line of sight when the line of sight is moved.

9. An image display method performed by a computer, comprising:
detecting a direction of a line of sight of a user wearing a head-mounted display or an orientation of the user's head;
generating a first image regarding main content selected by the user as an item to be displayed on the head-mounted display,
wherein the first image is a full screen game image of a video game;
causing the head-mounted display to display a second image regarding content different from the main content for promoting recognition of a given thing or service together with the first image;
a step of controlling a manner in which the second image is displayed on the head-mounted display in accordance with the direction of the user's line of sight or the orientation of the user's head;
detecting, of a plurality of regions of the first image, a region that matches the direction of the user's line of sight or the orientation of the user's head as a region of interest; and
switching the content of the second image to a piece of content related to content identified in the full screen game image within the region of interest.

10. A non-transitory computer readable medium having stored thereon a computer program for a computer, comprising:
by a direction detection section, detecting a direction of a line of sight of a user wearing a head-mounted display or an orientation of the user's head;
by an image generation section, generating a first image regarding main content selected by the user as an item to be displayed on the head-mounted display,
wherein the first image is a full screen game image of a video game;
by a display control section, causing the head-mounted display to display a second image regarding content different from the main content for promoting recognition of a given thing or service together with the first image;
by the display control section, controlling a manner in which the second image is displayed on the head-mounted display in accordance with the direction of the user's line of sight or the orientation of the user's head; and
by a region-of-interest detection section, detecting, of a plurality of regions of the first image, a region that matches the direction of the user's line of sight or the orientation of the user's head as a region of interest,
wherein the display control section switches the content of the second image to a piece of content related to content identified in the full screen game image within the region of interest.

* * * * *